(12) United States Patent
Church et al.

(10) Patent No.: US 7,475,094 B2
(45) Date of Patent: Jan. 6, 2009

(54) AUTOMATIC MANAGEMENT OF DEPENDENCIES BETWEEN PHYSICAL AND LOGICAL ELEMENTS IN AN APPLICATION SET

(75) Inventors: Nathan Daniel Church, San Jose, CA (US); Joel Frank Farber, San Jose, CA (US); Teresa Lynn Leamon, San Jose, CA (US); Jeffrey Ralph Ruggles, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 261 days.

(21) Appl. No.: 11/372,806

(22) Filed: Mar. 10, 2006

(65) Prior Publication Data

US 2007/0214184 A1    Sep. 13, 2007

(51) Int. Cl.
  *G06F 12/00*    (2006.01)
  *G06F 17/30*    (2006.01)
(52) U.S. Cl. .................. 707/200; 707/204; 711/117
(58) Field of Classification Search ............. 707/103 R, 707/204, 200, 206; 715/500.1; 709/224; 711/117
  See application file for complete search history.

(56) References Cited

U.S. PATENT DOCUMENTS

| | | | |
|---|---|---|---|
| RE37,601 E | 3/2002 | Eastridge et al. | |
| 6,385,706 B1 | 5/2002 | Ofek et al. | |
| 6,829,688 B2 | 12/2004 | Grubbs et al. | |
| 6,996,587 B2* | 2/2006 | Wagener et al. | 707/204 |
| 7,028,252 B1* | 4/2006 | Baru et al. | 715/273 |
| 7,036,008 B2* | 4/2006 | Raghavachari et al. | 713/1 |
| 7,210,121 B2* | 4/2007 | Xia et al. | 717/106 |
| 2002/0059505 A1 | 5/2002 | St. Pierre et al. | |
| 2004/0078639 A1 | 4/2004 | Anna et al. | |
| 2004/0117585 A1 | 6/2004 | Glider | |
| 2005/0193034 A1 | 9/2005 | Kitsuregawa et al. | |
| 2005/0228949 A1 | 10/2005 | Yamamoto et al. | |

OTHER PUBLICATIONS

U.S. Appl. No. 11/040,741, filed Jan. 21, 2005, Wightwick et al.

* cited by examiner

*Primary Examiner*—Apu Mofiz
*Assistant Examiner*—Susan Chen
(74) *Attorney, Agent, or Firm*—Duke W. Yee; Terrance J. Carroll; Cathrine K. Kinslow

(57) ABSTRACT

A mechanism minimizes the management issues of the participant objects of the logical target set, such as an application set. The mechanism maps the current physical implementation. The mechanism then identifies the target and extraneous object set locations to facilitate isolation. Thereafter, the mechanism optimizes the logical target set placement for best manageability and performance. The mechanism minimizes the management issues by providing a small application footprint. This is accomplished by placing the object set on the fewest necessary volumes to facilitate both application performance and independence of administrative action.

6 Claims, 4 Drawing Sheets

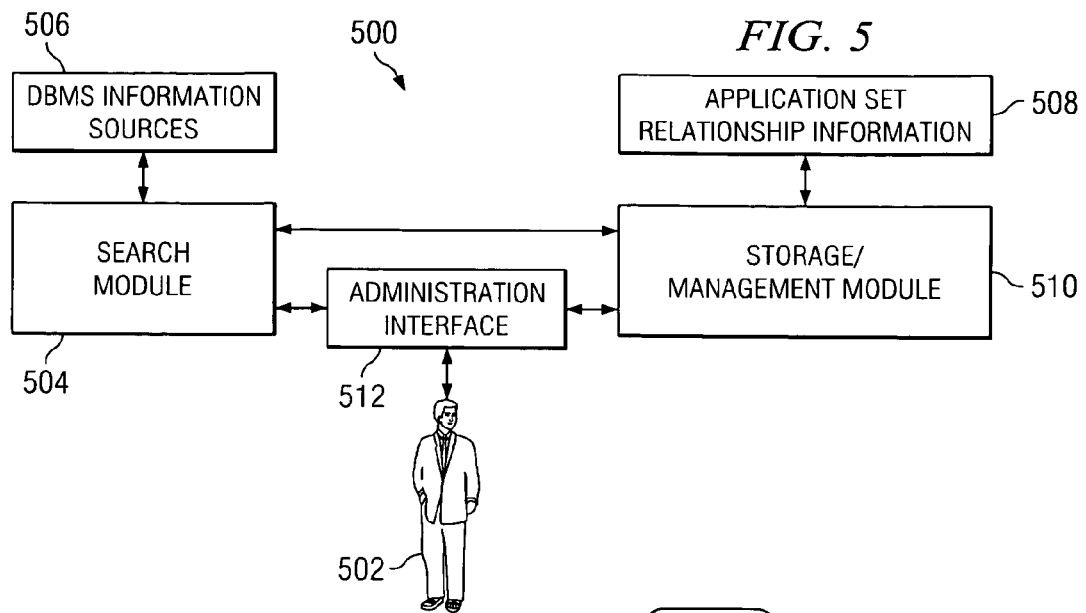
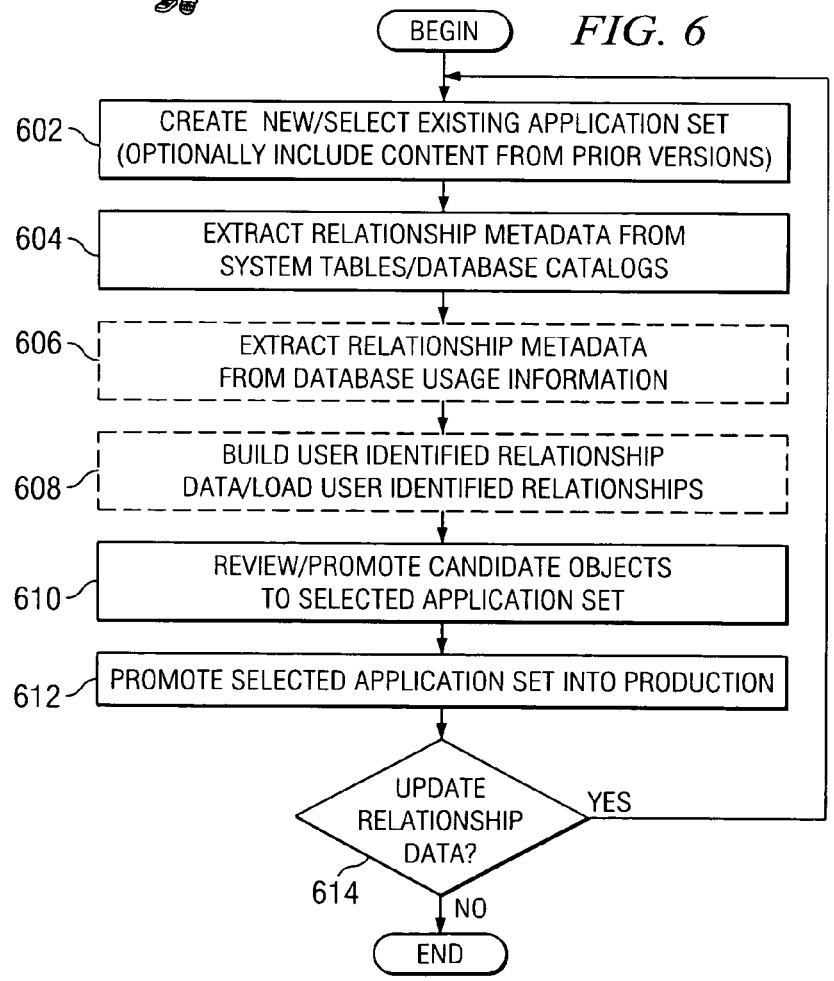

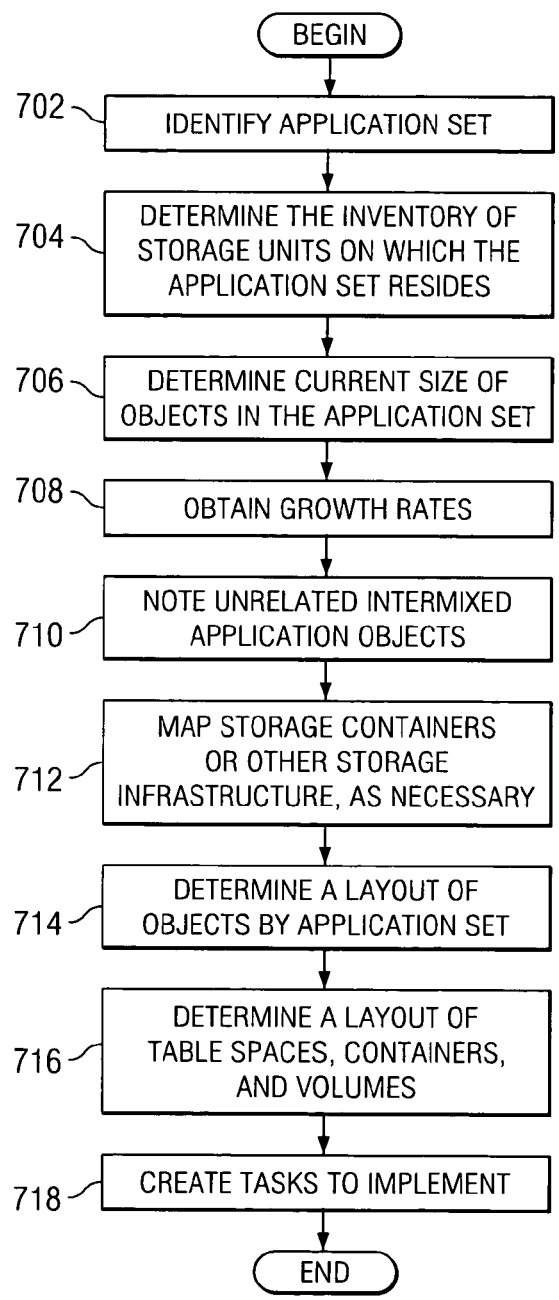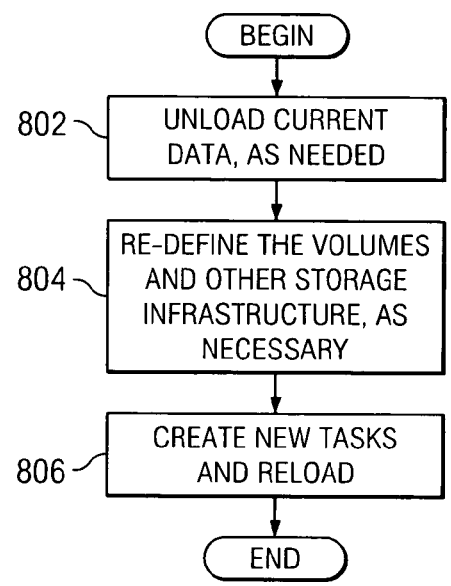

US 7,475,094 B2

AUTOMATIC MANAGEMENT OF DEPENDENCIES BETWEEN PHYSICAL AND LOGICAL ELEMENTS IN AN APPLICATION SET

BACKGROUND OF THE INVENTION

1. Field of the Invention

The instant disclosure relates generally to stored information systems. More particularly, this disclosure relates to management of dependencies between physical and logical elements in an application set.

2. Description of the Related Art

A business application has many dependencies between its data elements. There are also dependencies imposed and implied by the physical location where the application components are stored. Being aware and factoring the impact of these dependencies is an administratively challenging task, one that is usually not managed with adequate precision required to maintain full data integrity.

Those involved with the administrative task of managing databases may not concern themselves with the relationships between the physical implementation of the stored data particularly with placement of databases on the storage units. Meanwhile, those involved with storage may not concern themselves with the logical groupings of objects being stored.

An application is comprised of a set of objects. An accurate inventory of these objects is necessary. These objects have both a logical role and a physical implementation. However, many administrative operations are only defined for specific types of objects, which might not map to the application set of objects with uniform coverage.

For example, in certain relational databases, data backups are available by tablespace or by database, but not by file container or table. A database is comprised of a number of tablespaces which store data. A tablespace may be thought of as a child of a parent database, where the child tablespace cannot have more than one parent database. A tablespace is related to the use of the data stored in the tablespace. Thus, tablespaces are classified according to their use and how they are managed. It may be useful to be able to recover a table, but in these systems, a tablespace is the minimum granularity of backup and restore supported. On many storage systems, hardware physical backups are commonly available only by file or by storage volume. A given application can span multiple instances of each of these constructs. This is a mismatch in granularity and the physical infrastructure support available.

SUMMARY OF THE INVENTION

The different aspects of the present invention provide a computer implemented method for resolving intermixed application objects in storage. An identification of an application set, where the application set comprises a grouping of application objects related to an application is provided. A determination of application objects unrelated to the application and which physical storage units the application objects reside on is performed. A determination of a layout of the application objects based on the determined physical storage units where the application objects reside is provided in order to increase manageability of the application. Finally, tasks are created to implement the determined layout of the application objects.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 depicts an administrative tool for discovering, recording, and maintaining stored information system object relationships and for managing the stored information system based upon knowledge of sets of related objects that support one or more identified stored information system applications in accordance with an illustrative embodiment of the present invention;

FIG. 6 is a flowchart illustrating an operation of identification of stored information system object relationships and the development and maintenance of logical application sets based upon the object relationship information obtained in accordance with an illustrative embodiment of the present invention;

FIG. 7 is a flowchart illustrating an operation of a management module for resolving intermixed application sets in storage in accordance with an illustrative embodiment of the present invention; and FIG. 8 is a flowchart illustrating an operation of a management module implementing tasks for placing application sets to facilitate independence of administrative action in accordance with an illustrative embodiment of the present invention.

DETAILED DESCRIPTION OF THE PREFERRED EMBODIMENT

Figure 1:
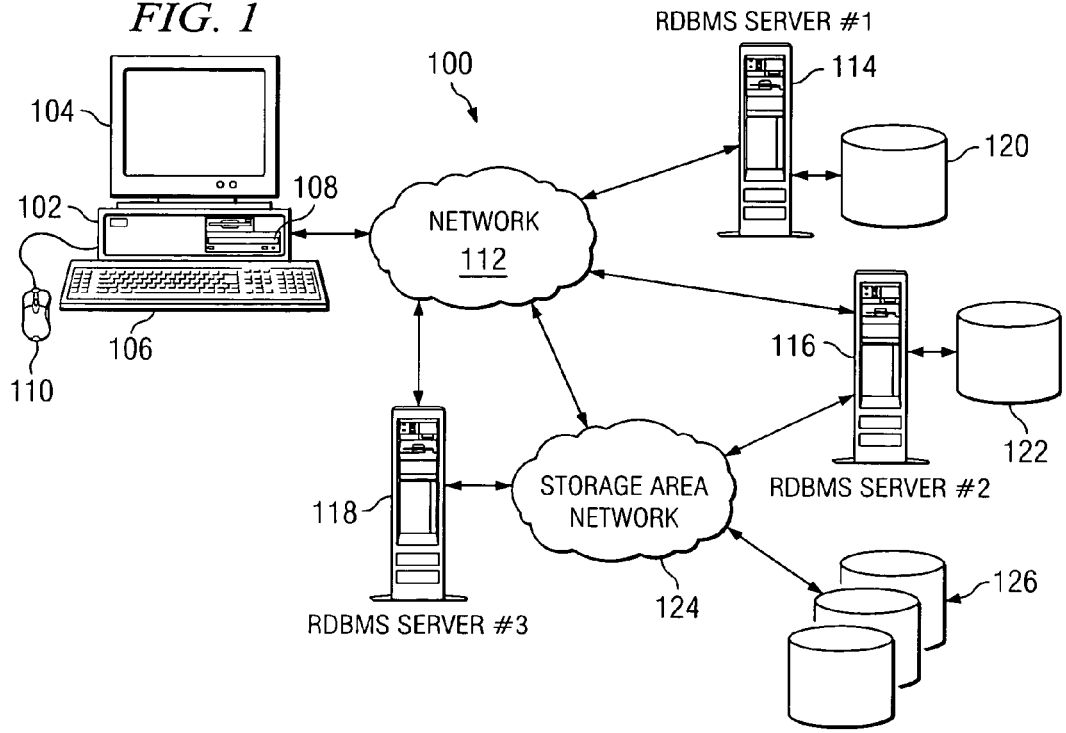
FIG. 1 illustrates a system capable of supporting multiple embodiments of an administrative tool for discovering, recording, and maintaining object relationships and for managing the stored information system based upon knowledge of sets of related objects that support one or more identified applications.
Figure 2:
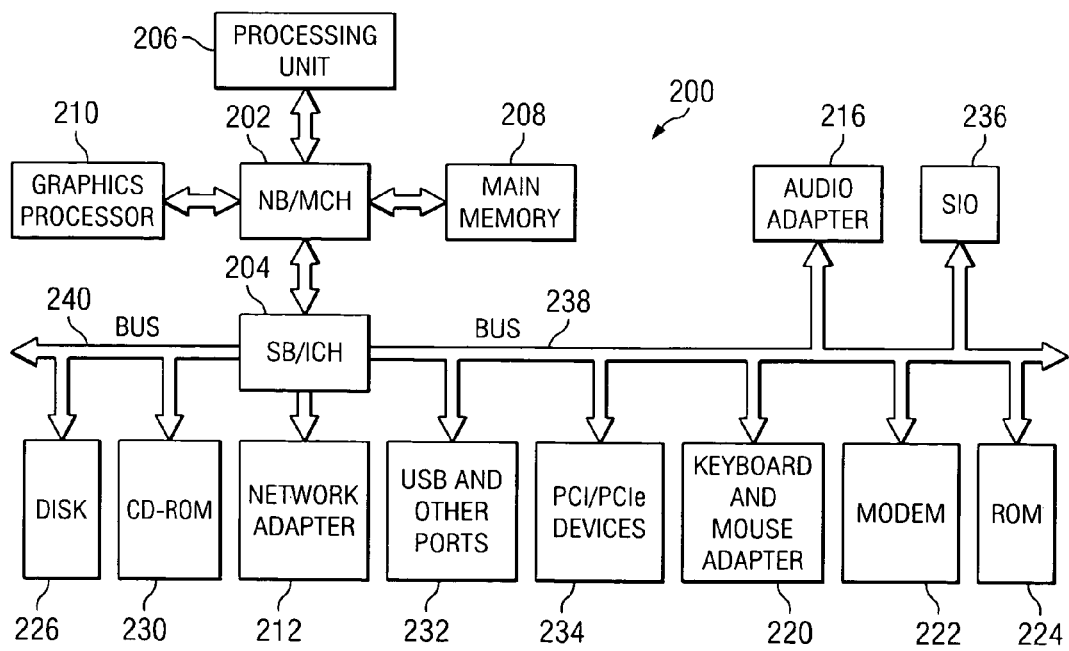
FIG. 2 is a block diagram of a data processing system in which aspects of the present invention may be implemented.

With reference now to the figures and in particular with reference to FIGS. 1-2, exemplary diagrams of data processing environments are provided in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

In accordance with the illustrative embodiments described herein, a mechanism is provided for discovering dependencies between objects in a stored information system and resolving intermixed application sets on storage units. A storage unit may also be considered a physical storage unit where data or application objects may be stored. Inter-object dependencies may be tracked and managed with either a coarse or fine grained resolution. Automated location, augmentation, and management of stored information system object relationship information greatly reduces the human effort required to collect and maintain a comprehensive information base of object relationships.

The automated object relationship techniques described may be executed on a periodic basis or continuously to assure that the maintained information base of object relationships and application set groupings accurately reflect the current stored information system environment. Furthermore, administrators may manually edit and augment object relationship information using techniques that efficiently and effectively integrate manually augmented relationship data with the described automated discovery techniques. Knowledge of application sets allow a system administrator to implement effective strategies for backup and recovery, disaster recovery, storage assignments, performance analysis, archiving, selective partial archiving, relocation, replication, capacity planning, and other activities that streamline administrative procedures and assure the integrity and consistency of an application set, thereby maximizing the integrity, availability, and reliability of data stored within the stored information system.

FIG. 1 illustrates a system capable of supporting multiple embodiments of an administrative tool for discovering, recording, and maintaining object relationships and for managing the stored information system based upon knowledge of sets of related objects that support one or more identified applications. Given the distributed nature of modern stored information systems, the mechanism described here is applicable to a wide range standalone and networked operational environments. For example, a modern stored information system (such as IBM Corporation's DB2®) is capable of presenting a transparent interface to information that is distributed across numerous disparate physical devices interconnected via a network. Specifically, the system may include stored information system administration client 102 in an end-user computer system in communication with or connected to network 112, such as the Internet, and one or more stored information system server computer systems 114, 116, and 118. Stored information system server computer systems 114 and 116 each have respective storage devices 120 and 122. Stored information system server computer systems 114, 116, and 118 may also access other network addressable data storage devices 126 through storage area network 124.

Administration client 102 may be a conventional personal or other suitable computer system (e.g., lap top, desktop, PDA, etc.) preferably equipped with a display or monitor 104, system unit 108 (e.g., including the processor, memory and internal or external communications devices (e.g., modem, network cards, etc.)), a keyboard or other entry device 106 and optional mouse 110 or other pointing device. Administration client 102 includes administration client software (e.g., operating system, network/communications software, administration client software, Internet browser, etc.) and appropriate components (e.g., processor, disk storage or hard drive, etc.) having sufficient processing and storage capabilities to effectively execute the software. Preferably, the end-user system uses any one of the well-known operating systems.

Similarly, stored information system server systems 114, 116, and 118 are typically implemented by a conventional personal or other suitable server computer system and preferably equipped with a system unit (e.g., including the processor, memories and internal or external communication devices (e.g., modem, network cards, etc.)) and optional display and input devices (e.g., a keyboard or other entry device, a mouse or other pointing device, etc.). The server system can include software (e.g., operating system, network/communications software, stored information system, etc.) to communicate with administrator client 102 and process requests, and appropriate components (e.g., processor, disk storage or hard drive, etc.) having sufficient processing and storage capabilities to effectively store stored information system data.

A stored information system server system preferably uses any of the commercially available operating systems, databases and/or server software, and, under software control, can employ any stored information system (e.g., IBM Corporation's DB2®) and related information store. Network accessible data storage devices 126 are any commercially available device capable of providing storage capacity to one or more local or remote stored information systems via storage area network 124. Network accessible data storage devices 126 may be accessed by administration client 102 through network 112 and storage area network 124. Likewise, stored information system server computer system 114 may access network accessible data storage devices 126 through network 112 and storage area network 124. Stored information system server computer system 116 may access network accessible data storage devices 126 similar to stored information system server computer system 114 or directly through storage area network 124. Stored information system server computer system 118 has no storage device directly attached and may access network accessible data storage devices 126 similar to stored information system server computer system 114 or directly through storage area network 124.

With reference now to FIG. 2, a block diagram of a data processing system is shown in which aspects of the present invention may be implemented. Data processing system 200 is an example of a computer, such as server 114, 116, 118 or client 102 in FIG. 1, in which computer usable code or instructions implementing the processes for embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (IBM, DB2, eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for embodiments of the present invention are performed by processing unit 206 using computer usable program code, which may be located in a memory such as, for example, main memory 208, ROM 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course, the bus system may be implemented using any type of communication fabric or architecture that provides for a transfer of data between different components or devices attached to the fabric or architecture. A communication unit may include one or more devices used to transmit and receive data, such as modem 222 or network adapter 212 of FIG. 2. A memory may be, for example, main memory 208, ROM 224, or a cache such as found in NB/MCH 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
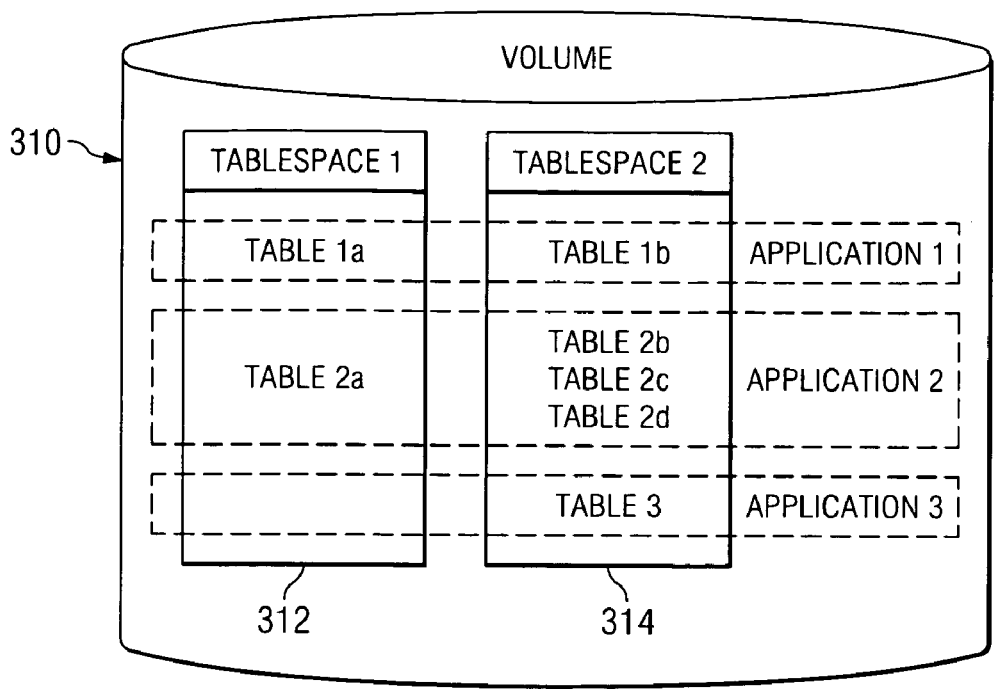
FIG. 3 is a block diagram illustrating storage of intermixed application objects in accordance with an exemplary embodiment.

FIG. 3 is a block diagram illustrating storage of intermixed application objects in accordance with an illustrative embodiment of the present invention. An application object may be data associated with a specific application, such as a table. Intermixed application objects are application objects that exist on the same storage unit but are not associated with one specific application. Logically, an application object or group of application objects may belong to an application set. Consider a first application, application 1, all of whose application objects are located on volume 310. Volume 310 also stores some parts of application 2 and application 3.

The application objects of application 1, in the depicted example, include table 1a and table 1b. Table 1a and 1b comprise the grouping of application objects for application 1. The application objects of application 2 include table 2a, table 2b, table 2c, and table 2d. Tables 2a, 2b, 2c, and 2d comprise the grouping of application objects for application 2. The application objects of application 3 include only table 3, in this example. Table 3 comprises the grouping of application objects for application 3.

It is ideal to manage application objects as a coherent set without impacting other application objects that are not members of the application set. Some application sets are suboptimally stored by having extraneous non-set application objects intermixed. Due to poor management of application objects, table 1a of application 1 is stored in tablespace 1 312, while table 1b of application 1 is stored in tablespace 2 314. For instance, if a table that does not have an explicitly provided tablespace name is added to a database, it may be placed into the default tablespace. This causes application objects to be physically intermixed without regard to their application.

With intermixed application objects, when a management operation is performed on a storage unit, multiple applications objects may be affected, perhaps with disastrous results. A management operation may include, for example, load, backup, restore, archive, create test copies, migrate, etc. A storage unit, in this case, may be a unit of storage with the minimum granularity. In the depicted example, a storage unit may be a tablespace or a volume.

In the example shown in FIG. 3, tablespace 1 312 also stores table 2a of application 2 and tablespace 2 314 also stores table 2b, table 2c, table 2d of application 2, and table 3 of application 3. Intermixing application objects may also happen for many other reasons. Regardless of the reason, intermixed application objects may cause significant problems. For example, if one wishes to backup the application objects of application 1, one must backup tablespace 1 312 and tablespace 2 314. When the user wishes to restore application 1, all of tablespace 1 312 and tablespace 2 314 must be restored. A volume restore operation on volume 310 would restore application 1 back to a prior state. However, such a volume restore operation would also modify unrelated intermixed application objects on volume 310 belonging to application 2 and application 3.

In accordance with an illustrative embodiment, a mechanism minimizes the management issues by providing a small application footprint. This is accomplished by placing the application object set on the fewest necessary volumes to facilitate both application performance and independence of administrative action. The mechanism identifies the participant application objects of the logical target set, such as an application set. Then, the mechanism maps the current physical implementation. The mechanism then identifies the target and extraneous application object set locations to facilitate isolation. Thereafter, the mechanism optimizes the logical target set placement for best manageability and performance.

Figure 4:
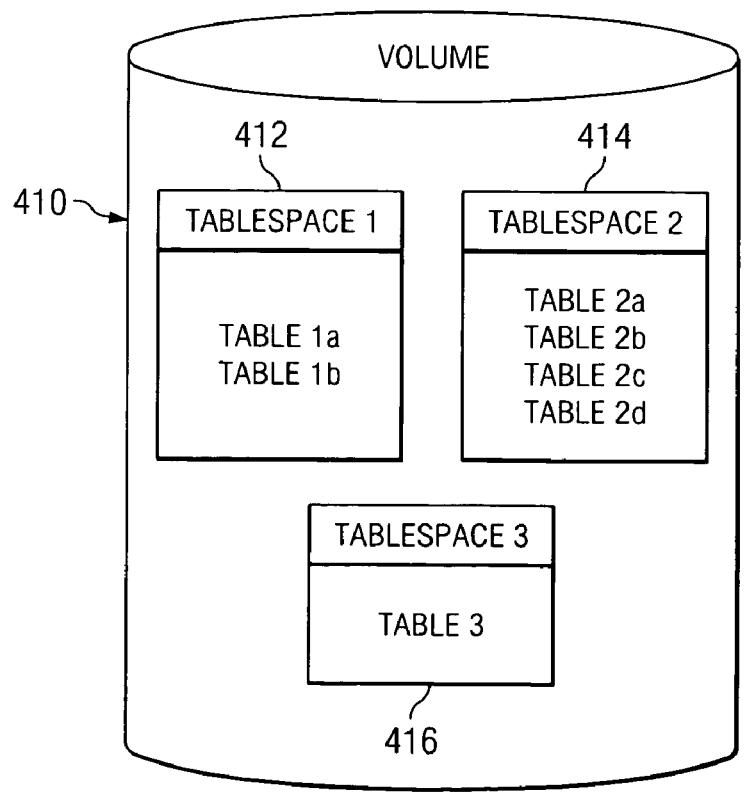
FIG. 4 is a block diagram illustrating storage of optimized sets of application objects in accordance with an exemplary embodiment.

FIG. 4 is a block diagram illustrating storage of optimized application sets of application objects in accordance with an illustrative embodiment of the present invention. Volume 410 includes tablespace 1 412, tablespace 2 414, and tablespace 3 416. In the depicted example, the optimum layout of tablespaces places each application set in its own tablespace. Therefore, table 1a and table 1b of application 1 is in tablespace 1 412; table 2a, table 2b, table 2c, and table 2d of application 2 is in tablespace 2 414; and, table 3 is in tablespace 3 416. As can be seen, each tablespace may be backed up or restored without affecting the other application set. Optimizing the layout of tablespaces increases manageability of the tablespaces and thereby performance of the application. As an alternative illustrative embodiment, tablespace 1 412, tablespace 2 414, and tablespace 3 416 may be located on separate volumes.

FIG. 5 depicts administrative tool 500 for discovering, recording, and maintaining stored information system object relationships and for managing the stored information system based upon knowledge of application sets of related application objects that support one or more identified stored information system applications in accordance with an illustrative embodiment of the present invention. These components include program instructions recorded on a computer-usable medium, such as a magnetic disk, optical disk, semiconductor memory, or transmission medium.

Search module 504 accesses stored information sources 506 and retrieves application object relationship information that search module 504 passes to storage/management module 510. Stored information sources 506 may be storage units such as network accessible data storage device 126 and storage devices 120 and 122 of FIG. 1, volume 310 of FIG. 3, or volume 410 of FIG. 4. Storage/management module 510 organizes the application object relationship information collected and permanently stores the application object relationship information into application set relationship information 508 within the stored information system. System administrator 502 interacts with both search module 504 and storage/management module 510 via administration interface 512. Administration interface 512 allows system administrator 502 to issue control instructions to search module 504 for searching and collecting application object relationship information and to issue instructions to storage/management module 510 with respect to the storage and management of application sets. Furthermore, administration interface 512 allows system administrator 502 to retrieve previously stored application set relationship information 508 via storage/management module 510 and to initiate administrative procedures, the focus and execution of which is upon application objects identified within the retrieved application set dependency information.

Storage/management module 510 may also perform operations to minimize the management issues that result from intermixed application sets. This is accomplished by placing the application object set on the fewest necessary volumes to facilitate both application performance and independence of administrative action. Storage/management module 510 identifies the participant application objects of the logical target set, such as an application set as described above. Then, storage/management module 510 maps the current physical implementation. Storage/management module 510 then identifies the target and extraneous application object set locations to facilitate isolation. Thereafter, storage/management module 510 optimizes the logical target set placement for best manageability and performance.

FIG. 6 is a flowchart illustrating an operation of identifying stored information system application object relationships and the development and maintenance of logical application sets based upon the application object relationship information obtained in accordance with an illustrative embodiment of the present invention. It will be understood that each block of the flowchart illustrations, and combinations of blocks in the flowchart illustrations, may be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks.

These computer program instructions may also be stored in a computer-readable memory, transmission medium, or storage medium that may direct a processor or other programmable data processing apparatus to function in a particular manner, such that the instructions stored in the computer-readable memory, transmission medium, or storage medium produce an article of manufacture including instruction means which implement the functions specified in the flowchart block or blocks.

Accordingly, blocks of the flowchart illustrations support combinations of means for performing the specified functions, combinations of steps for performing the specified functions and computer usable program code for performing the specified functions. It will also be understood that each block of the flowchart illustrations, and combinations of blocks in the flowchart illustrations, may be implemented by special purpose hardware-based computer systems that perform the specified functions or steps, or by combinations of special purpose hardware and computer instructions.

With particular reference to FIG. 6, the first time discovery techniques are executed, or whenever the user/administrator so chooses, a new version of an empty application set is created (block 602), and becomes the current application set. If prior versions of the application set exist, the administrator decides whether to include all or part of that data into the new persistent information store.

Next, relationship metadata is mined or extracted from system media, including data tables and catalogs, as previously discussed (block 604). Exemplary mining or extracting techniques may be static stored information system object relationship discovery techniques. Discovered application object relationship information that duplicates entries in the current application set is discarded. Mining or extracting techniques create additional unique candidate objects for updating the current application set. The administrator later reviews and decides which, if any, of the candidate objects and relationships to promote into the current application set (block 610).

Candidate objects that may augment the current application set are optionally identified based upon system and data usage information (block 606) by searching logs or traces of dynamic SQL, and other program code executed by the stored information system. Discovered object relationship information that duplicates entries in the current application set is discarded. These dynamic SQL discovery techniques create additional unique candidate objects for updating the current application set. The administrator later reviews and decides which, if any, of the candidate objects and relationships to promote into the current application set (block 610).

Additional candidate objects with which to augment the current application set are optionally identified based upon inter-object relationships. The object relationships may be of a nature that are not visible to the discovery techniques identified above, but may still be required to maintain proper operational processing capability (block 608). These object relationships may be added manually via the administration interface or via an API that facilitates adding these object relationships in bulk via an import file. Manually added object relationships allow inclusion of object relationships that may not be captured using the static discovery techniques, block 604, and dynamic discovery techniques, block 606, previously described. Duplicate application object relationships are discarded.

Next, as previously described in relation to blocks 604 and 606, the administrator reviews and decides which of the candidate objects and object relationships identified are to be promoted into the current application set (block 610). In one non-limiting representative embodiment, the discovered and/or manually entered object relationship information is made viewable to the administrator via the administration interface. As the object relationship information is viewed, object relationships may be selectively included within or excluded from the selected application set, based upon input from the administrator. If the new or updated application set version is to be used in support of administration routines, the administrator must schedule and execute promotion of the current version of the application set into production (block 612).

Using the administration tool described above, the user/administrator may generate new application sets or revised existing application sets as needed (block 614), with the operation ending thereafter.

FIG. 7 is a flowchart illustrating an operation of a management module for resolving intermixed application sets in storage in accordance with an illustrative embodiment of the present invention. Application sets may be sets such as tablespace 1 312 and tablespace 2 314 of FIG. 3. As the operation begins, the management module identifies an application set for a given application (block 702). The management module then determines on which storage units the application set resides (block 704).

Next, the management module determines a current size of application objects in the application set (block 706). The management module optionally obtains growth rates for the application objects for use in resizing (block 708). Application objects may increase and decrease in size over time depending on the information stored within the application object. A growth rate may be determined by reviewing a history of the application object and its growth or reduction over time. Thereafter, the management module determines any unrelated intermixed application objects, for example, unrelated tablespaces, other files co-resident in the application space or volume, etc. The management module notes these unrelated intermixed application objects (block 710).

The management module optionally maps the storage containers or other storage infrastructure, as necessary (block 712). Thereafter, the management module determines an optimum layout of application objects by application set (block 714) and determines an optimum layout of tablespaces, containers, and volumes (block 716). When determining the optimum layout of tablespaces, containers, and volumes, the management module may optionally consider growth rates of the application objects (free space requirements and projections for growth) in placement. This optimum layout may increase manageability of tablespaces, containers, and volumes and thereby performance of the application. The management module may also optionally consider usage and performance requirements in placement. In addition, the management module may optionally include a volume size recommendation to accommodate the application set on the minimum number of volumes, and set volume sizes as feasible. Next, the management module creates tasks to implement the determined layout of the application objects for resolving intermixed application sets (block 718), with the operation ending thereafter.

FIG. 8 is a flowchart illustrating operation of a management module implementing tasks for placing application sets in accordance with an illustrative embodiment of the present invention. As the operation begins, the management module unloads current application objects, as needed (block 802). Then, the management module re-defines the volumes and other storage infrastructure where the application objects are to be stored, as necessary (block 804). Next, the management module creates new data description language (DDL) tasks and reloads the application objects (block 806), with the operation ending thereafter.

Thus, the exemplary embodiments solve the disadvantages of the prior art by providing a mechanism that minimizes the management issues by providing a small application footprint. The mechanism places the object set for an application on the fewest necessary volumes to facilitate both application performance and independence of administrative action. The mechanism identifies the participant objects of the logical target set, such as an application set. Then, the mechanism maps the current physical implementation. The mechanism then identifies the target and extraneous object set locations to facilitate isolation. Thereafter, the mechanism optimizes the logical target set placement for best manageability and performance.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for resolving intermixed application objects comprising application objects related to an application and application objects unrelated to the application in storage, the computer implemented method comprising:

identifying an application set, wherein the application set comprises a grouping of application objects related to an application;

determining application objects unrelated to the application;

determining on which physical storage units the application objects reside;

obtaining a growth rate for the application objects;

setting free space requirements and projections based on the growth rate for the application objects;

determining a layout of the application objects based on the determined physical storage units where the application objects reside, wherein the layout increases manageability of the application, and wherein the determined layout of the application objects isolates application objects related to an application from application objects unrelated to the application;

determining a layout of tablespaces, containers, and volumes for the application set based on the free space requirements and projections to recommend an accommodation of the application set on a minimum number of volumes;

creating tasks to implement the determined layout of the application objects; and resolving intermixing of the application objects in storage by executing the tasks.

2. The computer implemented method of claim 1, further comprising:

determining a current size of the application objects.

3. The computer implemented method of claim 1, further comprising:

mapping an infrastructure of the physical storage units.

4. The computer implemented method of claim 1, wherein the layout of tablespaces, containers, and volumes for the application set is based on usage and performance requirements.

5. The computer implemented method of claim 1, wherein determining the layout of tablespaces, containers, and volumes for the application set comprises:

setting volume sizes according to the volume size recommendation.

6. The computer implemented method of claim 1, wherein the tasks created to implement the layout of application objects comprise:

unloading the application objects currently residing the physical storage units;

re-defining infrastructure of the physical storage units based on the layout of the application objects;

creating new data description language tasks; and loading the application objects in the defined infrastructure using the data description language task.

* * * * *